United States Patent [19]

Krambeck

[11] Patent Number: 4,776,574

[45] Date of Patent: Oct. 11, 1988

[54] SEAT BELT RETRACTOR REWIND SPRING ASSEMBLY

[75] Inventor: Dagoberto Krambeck, Sterling Heights, Mich.

[73] Assignee: General Safety Corporation, St. Clair Shores, Mich.

[21] Appl. No.: 28,056

[22] Filed: Mar. 19, 1987

Related U.S. Application Data

[63] Continuation of Ser. No. 795,841, Nov. 7, 1985, abandoned.

[51] Int. Cl.4 .................................. F16F 1/10

[52] U.S. Cl. .................................. 267/156; 185/45; 267/272; 267/290; 297/475; 368/140

[58] Field of Search .................. 280/807; 185/44, 45; 242/107; 297/474, 475; 368/140, 145, 147; 267/156, 199, 272, 290

[56] References Cited

U.S. PATENT DOCUMENTS

| | | | |
|---|---|---|---|
| 522,064 | 6/1894 | Keuffel | 242/107 |
| 934,114 | 9/1909 | Weaver | 242/107 |
| 2,714,019 | 7/1955 | Williams et al. | 242/107 X |
| 3,091,447 | 5/1963 | Donkin | 267/156 |
| 4,205,807 | 6/1980 | Shimogawa et al. | 242/107 |
| 4,285,478 | 8/1981 | Stamboulian | 185/45 X |
| 4,518,130 | 5/1985 | Gloomis | 280/807 X |

FOREIGN PATENT DOCUMENTS

| | | | |
|---|---|---|---|
| 2419734 | 11/1979 | France | 242/107 |
| 2659644 | 7/1978 | Fed. Rep. of Germany | 242/107 |
| 3001338 | 7/1981 | Fed. Rep. of Germany | 242/107 |

*Primary Examiner*—George E. A. Halvosa

*Attorney, Agent, or Firm*—Harness, Dickey & Pierce

[57] ABSTRACT

This invention relates to an improved seat belt retractor rewind spring assembly. In accordance with this invention, a rewind spring assembly is provided having the "bridling" effect wherein the coiled flat strip spring is retained by a spring cap which exerts an outwardly directed bending load on the end of the spring which engages the cap. This bridling effect has been found to increase the efficiency of the coil spring. The rewind spring assembly according to this invention improves over prior art designs in that completely automated assembly is possible through the provision of a novel spring cap design, assembly fixture and assembly process.

4 Claims, 3 Drawing Sheets

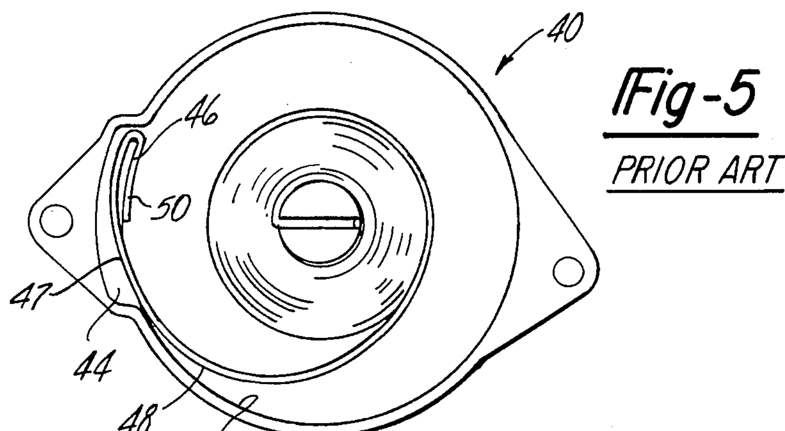
40
46
50
47
44
48
56
42
Fig-5
PRIOR ART
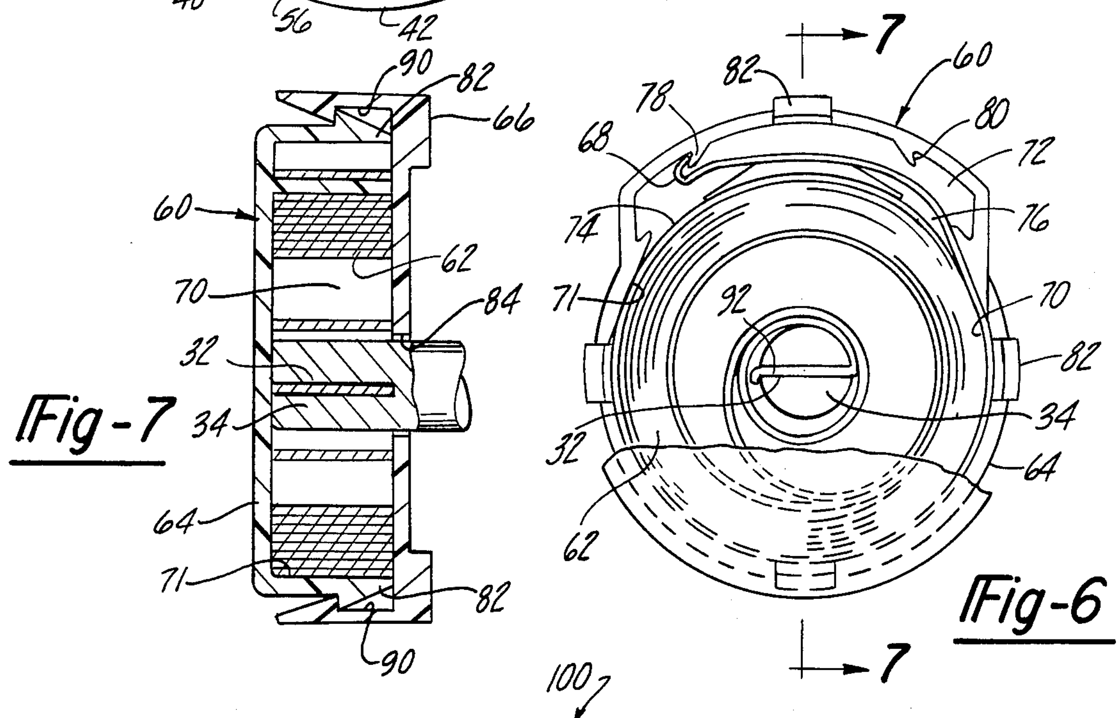
90
82
66
60
62
70
84
32
34
64
71
82
90
Fig-7
7
82
60
78
80
68
72
74
76
71
92
70
82
34
32
64
62
Fig-6
7
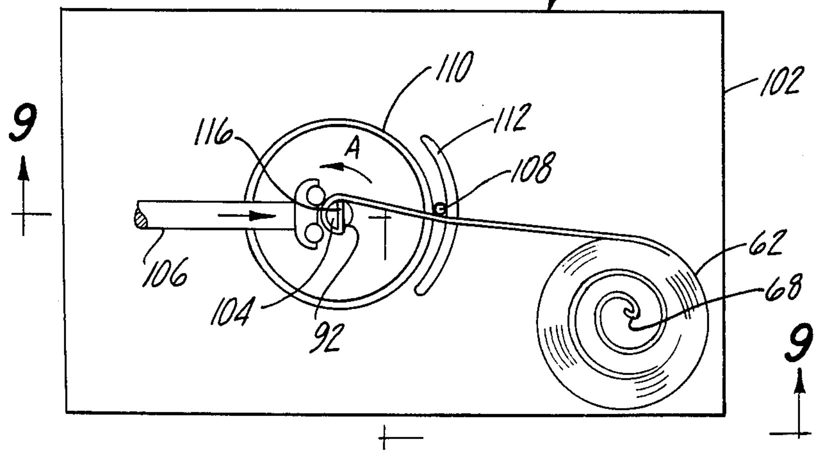
100
102
110
112
116
A
108
9
106
104
92
62
68
9
Fig-8

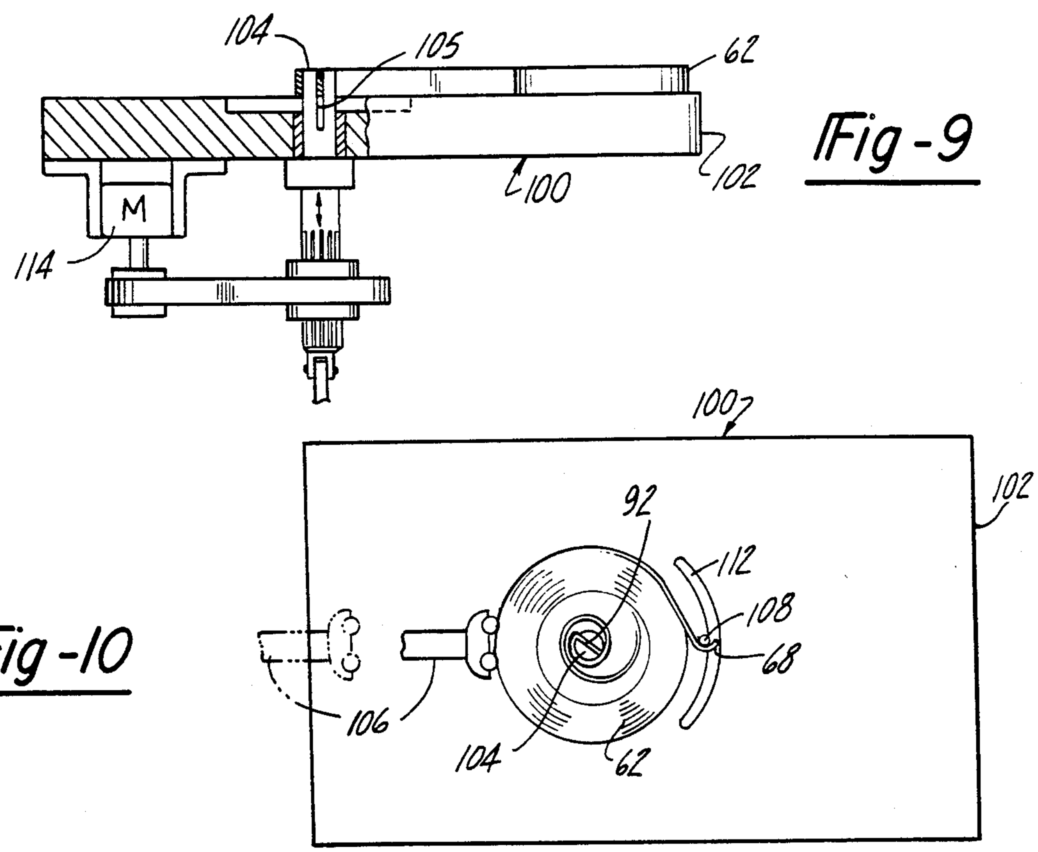
104
105
62
M
114
100
102
Fig-9
100
102
92
112
108
68
Fig-10
106
104
62
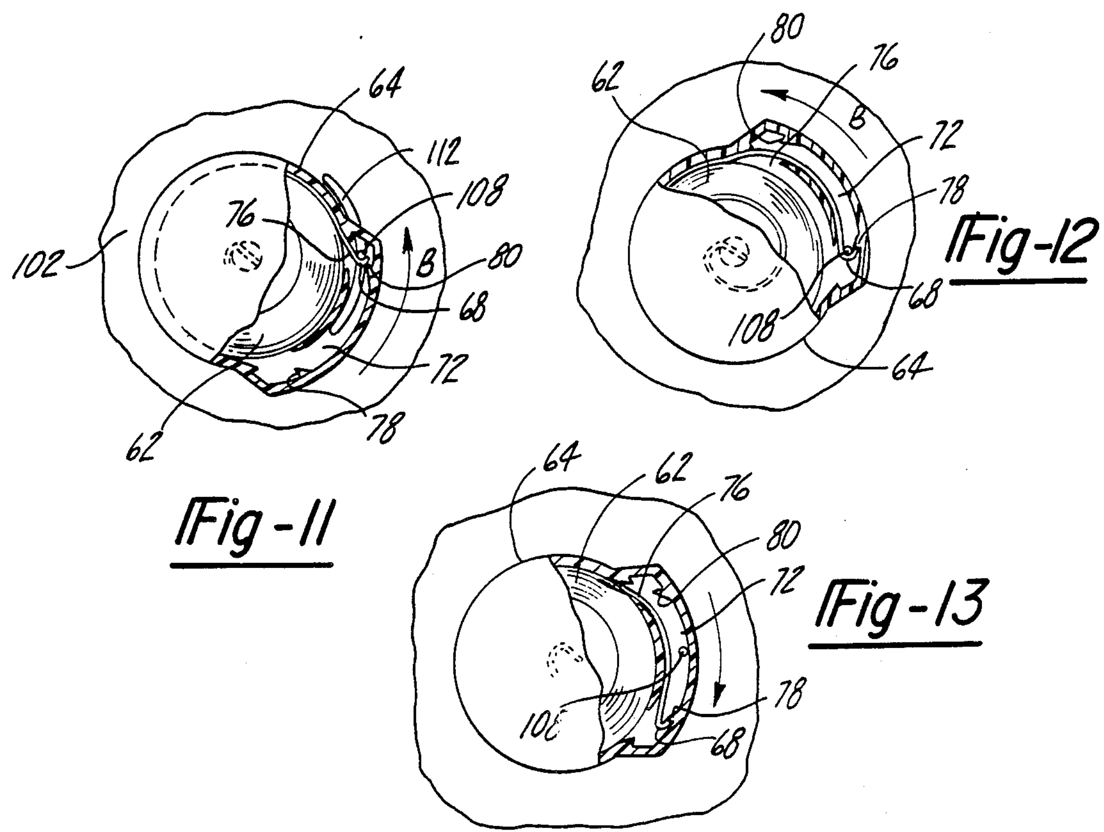
64
112
108
76
80
B
102
68
72
62
78
Fig-11
80
76
62
B
72
78
Fig-12
68
108
64
64
62
76
80
72
Fig-13
78
68

SEAT BELT RETRACTOR REWIND SPRING ASSEMBLY

This is a continuation of U.S. patent application Ser. No. 795,841, filed Nov. 7, 1985, now abandoned.

BACKGROUND AND SUMMARY OF THE INVENTION

This invention relates to coiled spring assembly and particularly to one adapted for use with motor vehicle seat belt retractors as a belt rewind spring.

Seat belt retractors are used in all types of motor vehicles to store seat belt webbing which is a part of the occupant protection system of the vehicle. Retractors employ a rewind spring assembly which causes the belt to be withdrawn into the retractor and rolled onto the retractor spool. The rewind spring assemblies typically used with retractors are comprised of a spring cap which retains a coiled steel strip spring. The spring has an outer end which engages the spring cap and an inner end which engages the rotating retractor spool shaft. Many types of existing rewind spring assemblies employ a spring cap which defines a small pocket which communicates with the interior of the cap by an aperture. The radially outer end of the spring has a bent over hook shaped end which engages the end pocket. While such spring assemblies operate successfully, they are relatively inefficient since, when the spring is wound tighly around the center shaft, the outer radial end of the spring is permitted to pivot in the end pocket which results in non-uniform stress levels on the spring. Optimal efficiency of a spring is achieved when the entire steering is subjected to a uniform stress level. As a means of increasing the efficiency of rewind spring assemblies, some retractor manufacturers have adopted spring cap designs which provide a so-called "bridling" effect. By designing the spring end retaining pocket of the spring cap such that a bending load is imposed on the spring end which urges the end of the spring to be forced toward the inside cylindrical surface of the spring cap, the efficiency of the spring can be increased. Enhanced efficiency of the spring permits shorter and lighter spring materials to be used, thereby providing savings in terms of component cost and also reducing the weight and size of the rewind spring assembly. Although it is currently known to provide a retractor rewind spring featuring the bridling effect, the processes now used to fabricate such rewind spring assemblies are very labor intensive and therefore costly, thereby detracting from the advantages of providing the bridling effect. Moreover, current designs of spring assemblies which provide the bridling effect require different spring caps depending on the rotational direction that the spring is wrapped therein.

In view of the foregoing, it is an object of this invention to provide an improved rewind spring assembly particularly adapted for use with seat belt retractors which produces the bridling effect but which can be assembled and manufactured at a minimum of cost. It is a further object of this invention to provide a spring cap which is adapted for rewind springs to be installed therein which are wrapped in either of the rotational directions.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 5 is a plan view of the rewind spring assembly shown in FIG. 4 showing the spring in a fully wound condition and illustrating the bridling effect;

FIG. 6 is a plan view of the improved rewind spring assembly in accordance with this invention;

FIG. 7 is a cross-sectional view taken along line 7—7 of FIG. 6;

FIG. 8 is a plan view of a machine useful for loading the spring into the spring cap in accordance with this invention;

FIG. 9 is a cross-sectional view taken along line 9—9 of FIG. 8; and FIGS. 10 through 13 are partial cross sectional views showing the spring cap and spring of the rewind spring assembly in accordance with this invention showing various sequences in a preferred manufacturing process.

DETAILED DESCRIPTION OF THE INVENTION

Figure 1:
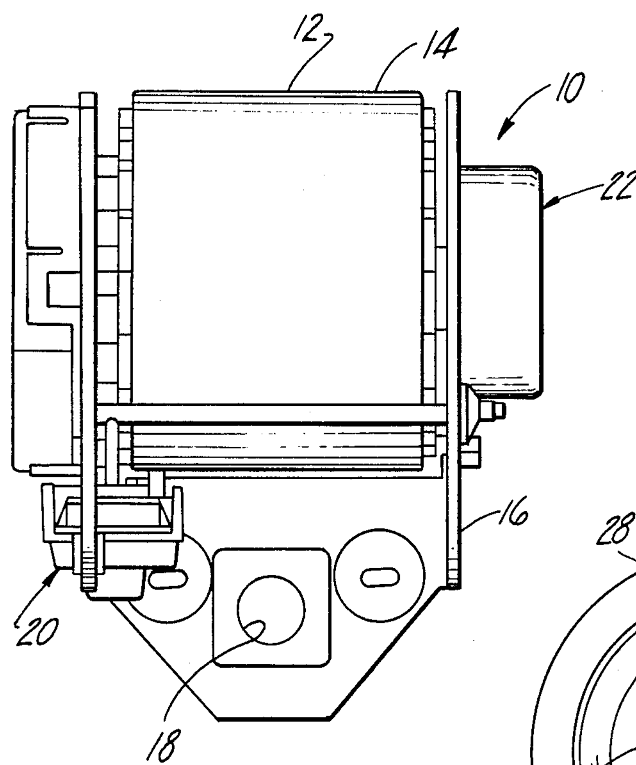
FIG. 1 is a plan view of an exemplary seat belt retractor of a type with which this invention is advantageously practiced.

FIG. 1 illustrates a conventional type seat belt retractor assembly 10 of the type typically used in motor vehicles to store seat belt webbing 12. Retractor 10 includes spool 14 which is carried for rotation by frame 16, which is mounted to an associated structure by a fastener through mounting hole 18. Retractor 10 may optionally include an inertia sensitive actuator 20 which permits seat belt webbing to be withdrawn under normal operating conditions, but which restricts extension of seat belt webbing 24 when the associated vehicle is subjected to deceleration levels above a predetermined magnitude. Rewind spring assembly 22 is mounted to frame 16 and rotationally biases spool 14 to retract seat belt webbing 12.

Figure 2:
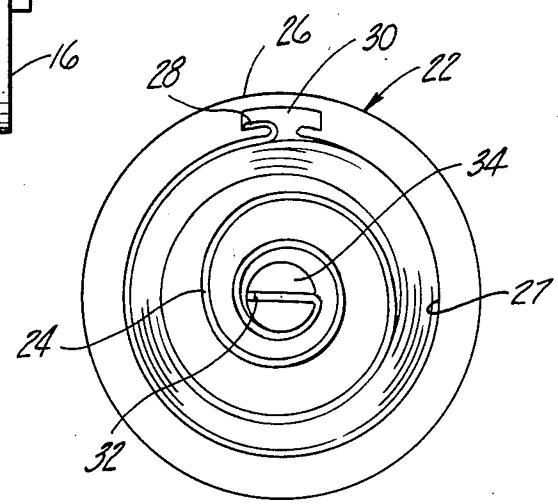
FIG. 2 is a plan view of a rewind spring assembly in accordance with one prior art design showing the spring in a relaxed state.
Figure 3:
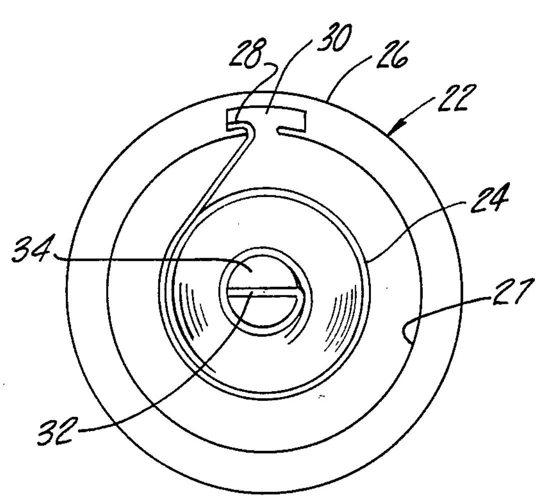
FIG. 3 is a plan view of the spring assembly shown in FIG. 2 with the spring in fully wound condition.

FIGS. 2 and 3 illustrate one type of prior art rewind spring assembly. Rewind spring assembly 22 employs a coiled steel strip spring 24 which is retained in spring cap 26. The outer radial end of strip spring 24 is deformed to define hook 28 which fits within spring end pocket 30. The other end of strip spring 24 is received by slot 32 within belt shaft 34 which is connected to spool 14. With this arrangement, rotation of belt shaft 34 causes spring 24 to be wound onto the belt shaft. FIG. 2 shows the relaxed state of spring 24 wherein it is packed against the cylindrical inner surface 27 of spring cap 26. FIG. 3 illustrates rewind spring assembly 22 after belt shaft 34 has been wound to increase the level of stress on spring 24. FIG. 3 also illustrates one disadvantage of prior art designs of rewind spring assemblies. As shown in that Figure, spring hook 28 is able to pivot with respect to spring end pocket 30 as the spring is pulled out of contact with spring cap inner surface 27. Since strip spring 24 provides its rotational biasing force on belt shaft 34 through energy stored due to bending loads on the spring, the efficiency of the spring is decreased since its end portion is not loaded in bending. Instead, as shown in FIG. 3, the end of spring 24 adjacent hook 28 becomes loaded in tension. Due to this effect, the overall efficiency of rewind spring assembly 22 is less than theoretically achievable with a given length of strip spring 24.

Figure 4:
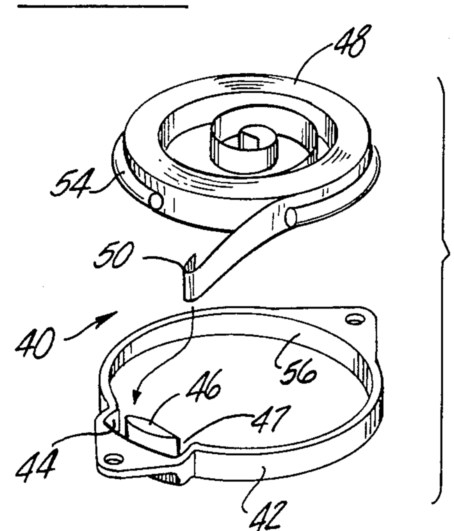
FIG. 4 is an exploded pictorial view of another prior art rewind spring assembly which produces the bridling effect and requires the use of a generally circular shaped retention clip for loading the spring into the spring cap.

Now with particular reference to FIGS. 4 and 5, a rewind spring assembly 40 according to another prior art design is shown. Spring cap 42 of spring assembly 40 includes a modified spring end pocket 44, featuring an elongated wall 46. Strip spring 48 defines a loop end 50. When strip spring 48 is loaded into end pocket 44, wall 46 acts on loop 50 to load the end of strip spring 48 in bending. As shown in FIG. 5, as the level of stress on strip spring 48 is increased, the end of spring 48 tends to remain against the inside cylindrical surface 56 of spring cap 42. This "bridling" effect has been found to increase the efficiency of coil springs to achieve a level of efficiency which more closely approaches the theoretical maximum achievable.

Although rewind spring assembly 40 in accordance with the prior art design shown in FIGS. 4 and 5 operate successfully, the device is difficult to assemble. With particular reference to FIG. 4, the process now used involves prewinding strip spring 48 and loading it into a "C" shaped clip 54. Clip 54 restrains spring 48 from expanding and enables it to be handled so that loop 50 can be carefully loaded onto wall 46 and so that the spring can be deflected such that the spring passes through gap 47. After loop 50 is properly positioned, strip spring 48 is located over the inside cylindrical surface 56 of spring cap 42 where an assembly fixture (not shown) presses spring 48 into the spring cap whereupon clip 54 disengages the spring and can be used for assembling other similar rewind spring assemblies 40. The particular design illustrated in FIGS. 4 and 5 further, in addition to being difficult to assemble, also suffers the disadvantage that spring cap 42 must be designed specifically for the intended direction of rotation of spring 48. This disadvantage results since spring end pocket 44 and wall 46 are asymmetrical with respect to a radius of spring cap 42.

Now with particular reference to FIGS. 6 and 7, rewind spring assembly 60 in accordance with this invention is illustrated. Rewind spring assembly includes strip spring 62 which is loaded into spring cap 64. Spring cap is fastened onto retractor 10 by engagement with cap retainer 66. Strip spring 62 is an elongated strip type spring having an outer hook-shaped end 68 and an inner end adapted to engage the slot 32 of a belt support shaft 34. Spring cap 64 has a generally cylindrical inside surface 71 in spring pocket 70 and an arcuate shaped spring end pocket 72 which communicates with the spring pocket by a pair of apertures 74 and 76. A pair of teeth 78 and 80 are provided within spring end pocket 72 and are adapted for engaging hook end 68. As shown in FIG. 6, hook end 68 engages tooth 78 and passes through aperture 76 to provide the bridling effect explained above and shown in FIG. 5. The configuration of spring end pocket 72 imposes a bending load on the end of spring 62 adjacent hook end 68. Spring cap 64 further defines a plurality of notched engaging fingers 82. Cap retainer 66 defines a central bore 84 which allows belt shaft 34 to extend into cap 64 and further has additional bores (not shown) which permit the retainer to be fastened to retractor frame 16. Cap retainer 66 further defines a plurality of apertures 90 which receive engaging fingers 82 of spring cap 64 so that, when assembled, the cap and cap retainer snap together and enclose spring 62.

In accordance with one feature of this invention, spring cap 64 enables spring 62 to be loaded therein in either rotational sense because the cap is symmetrical about a radius, i.e. the spring could also be loaded such that hook end 68 engages tooth 80 and passes through aperture 74.

The above-described configuration of spring 62 and spring cap 64 enables rewind spring assembly 60 to be manufactured using automated machinery, thereby providing a significant advantage over prior art rewind spring assemblies which feature the bridling effect. FIG. 8 illustrates rewind spring assembly machine 100 which includes table 102, winding arbor 104, clamp 106, and pin 108. Table 102 defines circular gooves 110 and 112 which receive spring cap engaging fingers 82. Arbor 104 as shown in FIG. 9 is driven for rotation by motor 114 and is also retractable from a position extending from table 102 to a retracted position flush with the table. Arbor 104 has a central slot 105 which is used for winding spring 62. Clamp 106 is a retractable member movable between the positions shown in FIG. 10. Pin 108 is disposed between grooves 110 and 112 and is a fixed member.

Now with particular reference to FIGS. 8 through 13, a preferred assembly sequence for rewind spring assembly 60 will be described. FIG. 8 shows strip spring 62 loaded onto rewind assembly machine 100 such that its inside end 92 is loaded onto arbor 104 by passing it through slot 105. The remainder of spring 62 is placed on one side of pin 108. Next, clamp 106 is moved to the position shown in FIG. 8 and motor 114 causes arbor 104 to rotate in the direction designated by reference letter A. Arbor 104 is rotated until spring 62 is fully wound on the arbor and hook end 68 engages pin 108, as shown in FIG. 10. During this process of winding spring 62, clamp 106 is retracted to the phantom line position shown in FIG. 10. Once spring 62 is fully wound, spring cap 64 is placed over spring 62 as shown in FIG. 11. In that position, spring 62 passes through aperture 76. Spring cap 64 is then rotated in the direction designated by arrow B until hook end 68 is pulled through end pocket 72 and interlocks with tooth 78, shown in FIG. 12. At this point, or as soon as spring cap 64 is placed over spring 62, arbor 104 is caused to rotate in an unwinding direction so that the spring becomes restrained by the inside cylindrical surface 71 of spring cap 64. After arbor 104 is "unwound", it may be retracted to a position flush with table 102. Thereafter, as shown in FIG. 13, the cap can be rotated again in the direction of arrow C so that pin 108 disengages hook end 68 whereupon the entire assembly 60 can be removed from rewind assembly machine 100. Rewind assembly machine 100 as described above enables rewind spring assembly 60, which provides the bridling effect, to be manufactured strictly using automated machinery which eliminates the requirement for expensive and time-consuming manual operations. The ability to assemble rewind spring assembly 60 using automated techniques is due primarily to the fact that the imposition of a bending load on the spring end which produces the bridling effect takes place when cap 64 is rotated with respect to spring 62. When cap 64 is rotated, spring 62 is constrained within the cap rather than being restrained by a separate or intermediate component such as clip 54 described above.

While the above description constitutes the preferred embodiments of the invention, it will be appreciated that the invention is susceptible to modification, variation, and change without departing from the proper scope or fair meaning of the accompanying claims.

What is claimed is:

1. In a torsion spring assembly of the type including a spring cap and a coiled spring disposed in said cap such that the radially outer end of said spring engages said cap and the radially inner end of said spring is adapted to engage an element which rotates with respect to said cap, the improvement of said spring cap resulting in a bending load upon said spring adjacent said spring outer end thereby increasing the efficiency of said spring, comprising:

said spring radially outer end defining a hook, and said spring cap defining a generally circular spring pocket, a circumferentially extending arcuate shaped spring end pocket, and a wall positioned between said spring pocket and said spring end pocket, said spring cap further defining an aperture communicating said circular spring pocket with said spring end pocket, said spring end pocket defining a first area adjacent said aperture for receiving said spring outer end, said spring end pocket further defining a tooth circumferentially displaced from said first area for engaging said spring hook, said spring end pocket having a radial dimension greater than said spring hook between said first area and said tooth thereby enabling said spring outer end to be positioned initially within said first area and thereafter circumferentially displaced from said first area through said spring end pocket and into engagement with said tooth, whereby said wall, said tooth, and said aperture cooperate to impose said bending load upon said spring when said spring hook is in engagement with said tooth.

2. The torsion spring assembly according to claim 1 wherein said cap spring pocket and spring end pocket communicate by a pair of apertures and said spring end pocket defines a pair of teeth, thereby enabling said spring to be wound in said spring cap in either rotational direction.

3. The torsion spring assembly according to claim 2 wherein said radially outer end of said spring defines a radially outwardly directed hook, and said spring end pocket tooth projecting in a radially inward direction to engage said hook.

4. The torsion spring assembly according to claim 1 wherein said bending load urges said spring to contact the inside surface of said spring pocket.

* * * * *